United States Patent [19]

Ishii

[11] Patent Number: 4,476,525
[45] Date of Patent: Oct. 9, 1984

[54] PIPELINE-CONTROLLED DATA PROCESSING SYSTEM CAPABLE OF PERFORMING A PLURALITY OF INSTRUCTIONS SIMULTANEOUSLY

[75] Inventor: Hideshi Ishii, Tokyo, Japan
[73] Assignee: NEC Corporation, Tokyo, Japan
[21] Appl. No.: 292,849
[22] Filed: Aug. 14, 1981

[30] Foreign Application Priority Data

Aug. 28, 1980 [JP] Japan .................... 55-118628

[51] Int. Cl.³ .................... G06F 9/38; G06F 7/00
[52] U.S. Cl. .................... 364/200
[58] Field of Search ... 364/200 MS File, 900 MS File

[56] References Cited

U.S. PATENT DOCUMENTS

| | | | |
|---|---|---|---|
| 3,840,861 | 10/1974 | Amdahl et al. | 364/200 |
| 4,025,771 | 5/1977 | Lynch, Jr. et al. | 364/200 |
| 4,179,736 | 12/1979 | Wilhite | 364/200 |
| 4,251,859 | 2/1981 | Momose et al. | 364/200 |
| 4,305,124 | 12/1981 | Marro et al. | 364/200 |
| 4,332,010 | 5/1982 | Messina et al. | 364/200 |

OTHER PUBLICATIONS

*The IBM System/360 Model 91: Machine Philosophy and Instruction-Handling,* Anderson et al., IBM Journal of Research and Development, vol. 11, No. 1, pp. 8-24, Jan. 1967.
*An Efficient Algorithm for Exploiting Multiple Arthmetic Units,* Tomasalo, IBM Journal of Research and Development, vol. 11, No. 1, pp. 25-33, Jan. 1967.

Primary Examiner—Gareth D. Shaw
Assistant Examiner—Daniel K. Dorsey
Attorney, Agent, or Firm—Sughrue, Mion, Zinn, MacPeak & Seas

[57] ABSTRACT

A pipeline-controlled data processing system includes decoding apparatus for decoding successive instructions and a detection device responsive to the decoding apparatus output for determining when a particular two-instruction sequence is present. When a first instruction calls for an operation to be executed and the execution result to be loaded into an arithmetic register, and when a second instruction immediately following the first instruction calls for the storing of the output of the arithmetic register into both a main memory unit and a cache memory, the execution result is simultaneously stored in all of the arithmetic register, main memory and cache memory.

2 Claims, 7 Drawing Figures

PIPELINE-CONTROLLED DATA PROCESSING SYSTEM CAPABLE OF PERFORMING A PLURALITY OF INSTRUCTIONS SIMULTANEOUSLY

BACKGROUND OF THE INVENTION

This invention relates to a data processing (DP) system capable of processing a plurality of instructions simultaneously (hereunder referred to as "pipeline-controlled DP system").

A conventional pipeline-controlled (PC) DP system is equipped with an execution unit consisting of a plurality of subunits, each of which can accomplish the high-speed operation for a given simple process of plural instructions. More specifically, each subunit is processing one or another part of a certain instruction at a given time, so that the execution unit can process such instructions simultaneously. However, since each execution of all the instructions over the whole subunits is done sequentially, the entire processing time becomes increasingly long.

For details of such a PC DP system, reference is made to an article entitled "The IBM System/360 Model 91: Machine Philosophy and Instruction Handling" by D. W. Anderson et al, IBM Journal of Research and Development, Vol. 11, No. 1, pp. 8–24, January issue, 1967 (Reference 1).

To solve such a disadvantage in the system shown in Reference 1, another type of PCDP system, in which all instructions are processed in parallel, is proposed in an article entitled "An Efficient Algorithm for Exploiting Multiple Arithmetic Units" by R. M. Tomasulo, IBM Journal of Research and Development, Vol. 11, No. 1, pp. 25–33, January issue, 1967 (Reference 2). With this proposed system, however, complicated control and hardware are inevitably needed.

SUMMARY OF THE INVENTION

An object of the present invention is, therefore, to provide a PCDP system free from the previous mentioned disadvantages experienced in the prior-art systems.

According to one aspect of the present invention, there is provided a PCDP system having an arithmetic register for storing an operation result, a main storage unit (MMU) for storing a plurality of instructions, each of said instructions having an operation code portion and an address portion, a cache memory unit for storing the same instructions as those stored in said MMU, and processing means for sequentially processing a series of instructions and simultaneously processing different cycles of said series of instructions with time lags so that corresponding cycles for processing each instruction may not be overlapped with each other.

This processing system further comprises: detection means to detect whether the operation code of a given first instruction for designating the execution and the loading of the execution result into said arithmetic register, and the operation code of a given second instruction for designating the storing of the output of the arithmetic register into both an address of said MMU designated by said address portion of the second instruction and an address of said cache memory unit designated by the address portion of the second instruction are given in that order; and means responsive to the first and second instructions and the detection of the consecutive occurrence of the first and second instructions by said detection means to perform the loading of the execution result obtained during the execution of the first instruction into said arithmetic register in parallel with the storing of said execution result obtained during the execution of the first instruction into the address of said MMU designated by the address portion of the second instruction and the address of said cache memory unit designated by the address portion of the second instruction, while controlling said processing means to stop the storing operation to be performed by the second instruction.

BRIEF DESCRIPTION OF THE DRAWINGS

The present invention will be described in greater detail with reference to the accompanying drawings, wherein.

In the drawings, the same reference numerals denote the same structural elements.

DETAILED DESCRIPTION OF THE PREFERRED EMBODIMENTS

Figure 1A:
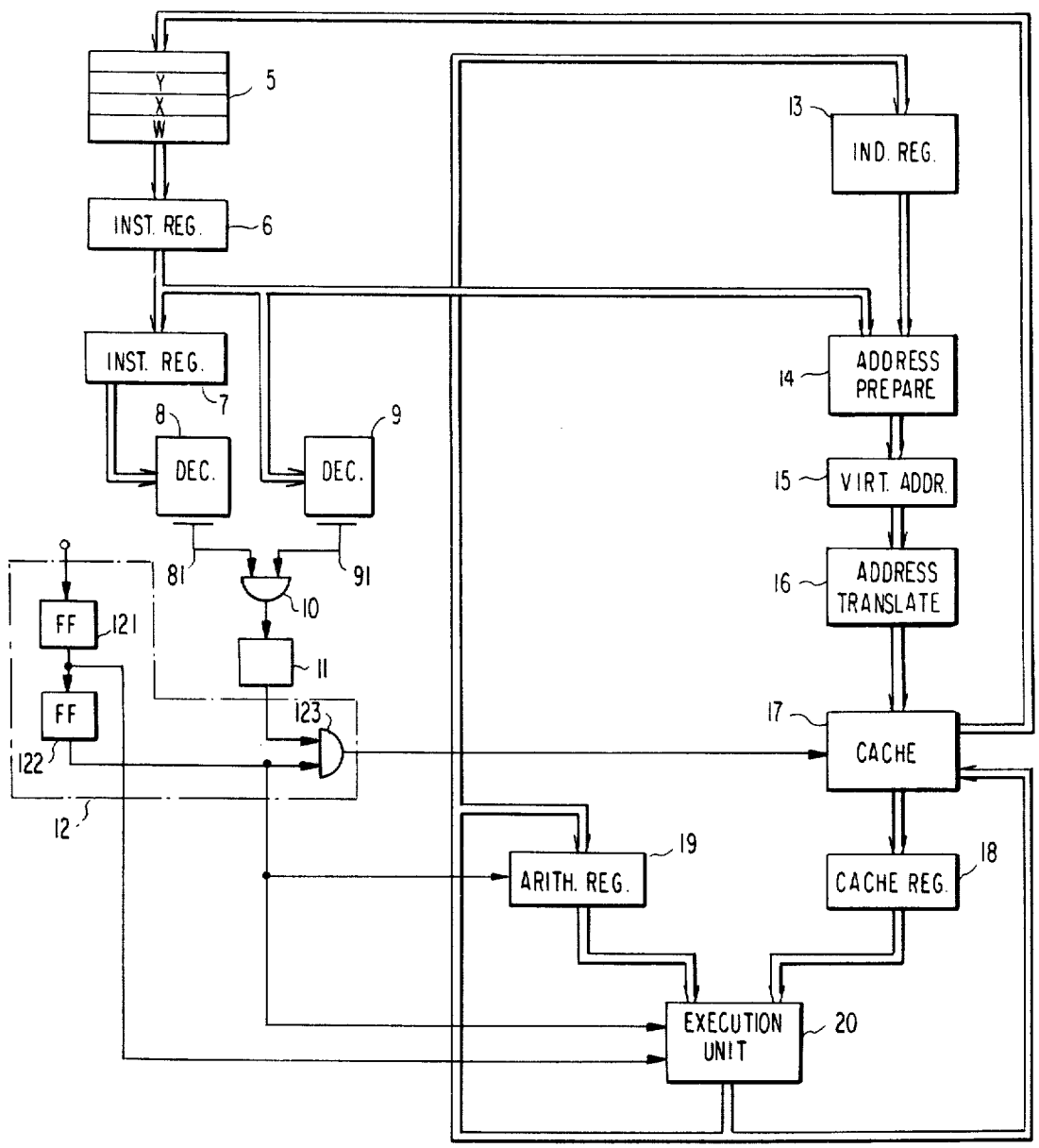
FIG. 1A shows a first embodiment of the present invention.

Referring to FIG. 1A, the first embodiment comprises an instruction prefetch buffer 5, a first instruction register 6, a second instruction register 7, a first decoder 8, a second decoder 9, a detection circuit 10, a register 11, a control circuit 12, an index register 13, an address preparation unit 14, a virtual address register 15, an address translation unit 16, a cache memory 17, a cache read register 18, an arithmetic register 19, and an execution unit 20. The cache memory 17 stores the same instructions as those stored in a main storage unit (MMU) (not shown). The first decoder 8 consists of a read-only memory (ROM) whose output 81 is "1" when an instruction set in the register 7 designates the execution and the loading of the execution result into the register 19. The second decoder 9 is also composed of an ROM whose output 91 is "1" when a instruction in the register 6 designates the storing of the output of the register 19 into the memory 17 and the MMU. The detection circuit 10 consists of an AND gate. The control circuit 12 comprises flip-flops (F/Fs) 121 and 122, and an AND gate 123. The address preparation unit 14, the cache memory 17, and the execution unit 20 have respectively the same structures as the address preparation unit 704-3, the cache unit 750, and the execution unit 714 shown in FIG. 2 of U.S. Pat. No. 4,179,736. The address translation unit 16 is made up of the associative array 22, the address control circuits 24, and the gates 15 shown in FIG. 1 and FIGS. 10 through 22 of U.S. Pat. No. 3,693,165.

Figure 1B:
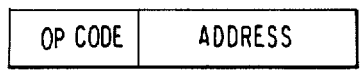
FIG. 1B shows a diagram for describing an instruction format.

Referring to FIG. 1B, an instruction used in the invention has an operation code (OP code) portion and an address portion.

The operation of the first embodiment will be described in detail with reference to FIGS. 1A to 3.

Referring to FIG. 1A, a series of instructions W, X, and Y from the memory 17 are stored in the buffer 5 and are successively read out of the buffer 5 to be stored in the register 6. The OP code (portion) of an instruction X in the register 6 is given to the register 7 and the decoder 9 in the following machine cycle. Another instruction W read in the cycle immediately preceding the read machine cycle of the instruction X, is already given to the decoder 8. A logical product of the output 91 and the output 81 is obtained by the detection circuit 10. The output of the circuit 10 is "1" when the OP code of the instruction W designates the execution and the loading of the execution result into the register 19 and the instruction X designates the storing of the data of the register 19 into the memory 17 and the MMU. Then, the OP code of an instruction Y is given from the buffer 5 to the register 6 and the decoder 9, in one machine cycle behind the read machine cycle of the instruction X. By this time, the OP code of the instruction X in the register 7 has been already given to the decoder 8 to permit the detection circuit 10 to obtain a logical product of the decoded result of the OP code of the instruction X by the decoder 8 and the decoded result of, the instruction Y by the decoder 9.

Figure 2:
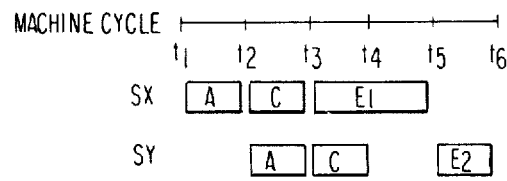
FIG. 2 shows a timing chart for describing the operation of a conventional system described in Reference 2.

Referring to FIG. 2, SX and SY represent the execution sequences of the instructions X and Y, respectively. Also, each of time intervals $t_2-t_1$, $t_3-t_2$, $t_4-t_3$, $t_5-t_4$, and $t_6-t_5$ is equal to one machine cycle.

Next, referring to FIGS. 1A and 2, in response to "0" of each of the decoded results of the two pairs of instructions W-X and X-Y, the output of the detection circuit 10 becomes "0" and is then stored in the register 11. Between the time points $t_1$ and $t_2$, the address portion of the first instruction X in the register 6 is given to the unit 14 to generate a virtual address of an operand data to be stored in the register 15 (this operation is done in the virtual address generation cycle A for the instruction X). Between the time points $t_2$ and $t_3$, the virtual address is then converted into a physical address in the address translation unit 16 and the operand data is read out of the memory 17 to be stored in the register 18 (this operation is carried out in the operand fetch cycle C of the instruction X). During the same period as that of this cycle, the cycle A of the instruction Y is executed. In this case, an execution cycle (hereunder referred to simply as "EX-cycle") $E_1$ in the machine cycle to process the instruction X is continuous to an EX-cycle $E_2$ in the machine cycle to execute the instruction Y.

Figure 3:
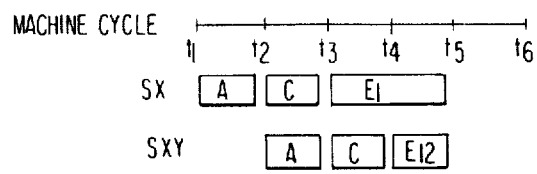
FIG. 3 shows a timing chart for describing the operation of the embodiment.

Referring to FIG. 3, the instruction X has the same sequence as the corresponding one shown in FIG. 2. The instruction Y has the same sequence as the corresponding one shown in FIG. 2 until the time point $t_3$, but has a different sequence from that shown in FIG. 2 after the point $t_3$. More specifically, at the point $t_3$ a start signal for the cycle E of the instruction X is given from a control unit (not shown) to the F/F 121. The output of the F/F 121 is given to the unit 20, so that the contents of the registers 18 and 19 are added in the unit 20. The output of the F/F 121 is set in the F/F 122. The output of the F/F 122 is given to the unit 20 and the register 19 to permit the addition result of the unit 20 to be stored in the register 19. In response to a "1" output of the register 11, the output of the F/F 122 is supplied to the memory 17 through the AND gate 123, so that the output of the register 19 is stored in an address portion of the memory 17 designated by the address of the instruction Y. This storing operation is performed in an execution cycle $E_{12}$. Accordingly, in response to a "1" output of the register 11, the instruction X is executed and the alternative operation is performed. Consequently, the same result as what would ensue from the execution of the instructions X and Y is obtained at a time point $t_5$. This embodiment consequently allows the whole instruction processing time ($t_1-t_5$) to be reduced by one machine cycle compared with that ($t_1-t_6$) of the conventional PCDP system.

Figure 4:
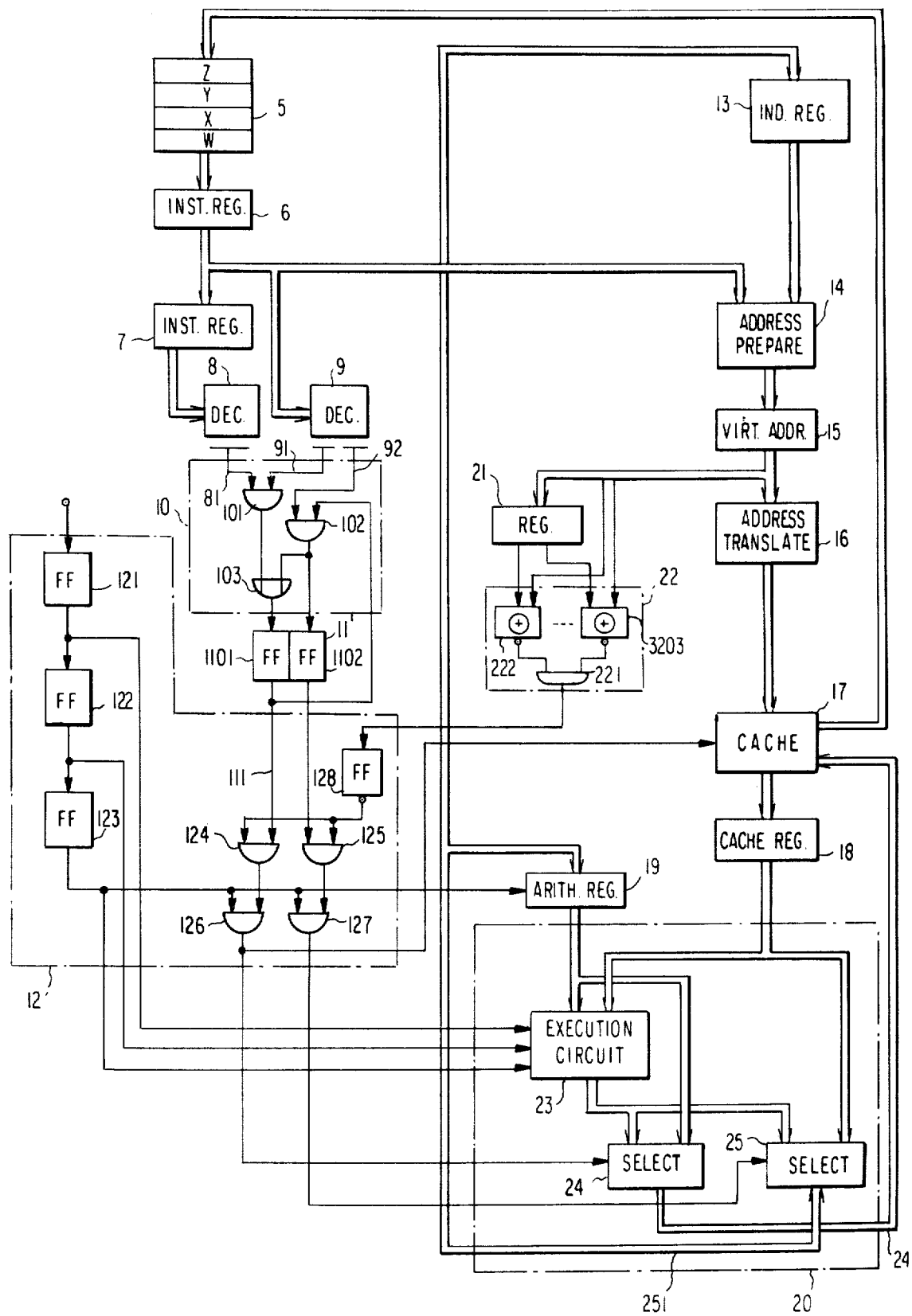
FIG. 4 shows a second embodiment.

Referring to FIG. 4, a second embodiment comprises an instruction prefetch buffer 5, a first instruction register 6, a second instruction register 7, a first decoder 8, a second decoder 9, a detection circuit 10, a register 11' having two F/Fs 1101 and 1102, a control circuit 12, an index register 13, an address preparation unit 14, a virtual address register 15, an address translation unit 16, a cache memory 17, a cache read register 18, an arithmetic register 19, an execution unit 20, a register 21 and an address identity detection circuit 22. The first decoder 8 consists of a ROM whose output 81 is "1" when the instruction in the register 7 designates the execution and the loading of the execution result into the register 19. The second decoder 9 also consists of an ROM whose output 91 is "1" when the instruction in the register 6 designates the storing of the output of the register 19 into the memory 17 and the MMU. Further, the output 92 of the decoder 9 becomes "1" when another instruction in the register 6 designates the loading of data of the memory 17 into the register 19 through the register 18 and a selector 25. The detection circuit 10 consists of AND gates 101 and 102 and an OR gate 103. The control circuit 12 comprises F/Fs 121, 122, 123, and 128, and AND gates 124, 125, 126, and 127. The execution unit 20 is made up of an execution circuit 23 and selectors 24 and 25. The address preparation unit 14, the cache memory 17 and the execution circuit 23 have respectively the same structures as the address preparation unit 704-3, the cache unit 750 and the execution unit 714 illustrated in FIG. 2 of U.S. Pat. No. 4,179,736. The address translation unit 16 comprises the associative array 22, the address control circuits 24, and the gates 15 shown in FIGS. 1 and 10 through 22 of U.S. Pat. No. 3,693,165. The identity-coincidence detection circuit 22 is composed of 43 Exclusive NOR gates 222 through 22n and an AND gate 221.

In FIG. 4, each circle marked at the outputs of the circuits 128, 222, and 22n means that each of the outputs is inverted.

Next, the operation of the embodiment will be described in detail referring to FIGS. 4, 5, and 6.

The OP codes of three consecutive instructions X, Y, and Z are examined by the detection circuit 10, and at the same time, the three addresses respectively generated from the address portions of the instructions X, Y, and Z are examined by the circuit 22 to detect whether both addresses between each of the two consecutive instructions, i.e., X and Y, and Y and Z are identical with each other. When either the instruction X does not designate the execution and the loading of the execution result into the register 19 or the instruction Y does not designate the storing of the output of the register 19 into the memory 17 and the MMU, at least one of the outputs 81 and 91 is "0". As a result, the output of the AND gate 101 in the circuit 10 is "0" and, unless the output of the AND gate 102 is "1", the output 111 of the F/F 1101 of the register 11' is also "0". The "0" of the output 111 is then given to the memory 17 and the selector 24 through the AND gates 124 and 126, respectively.

Figure 5:
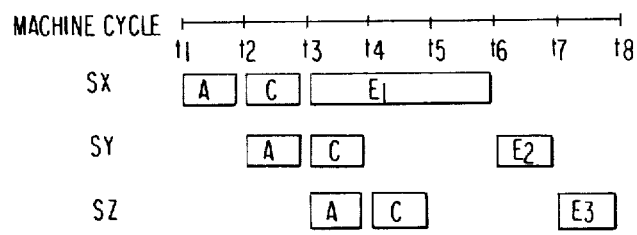
FIGS. 5 and 6 show timing charts for describing the operation of the second embodiment.

Turning to FIG. 5, the EX-cycle $E_1$ for the instruction X, the EX-cycle $E_2$ for the instruction Y, and the EX-cycle $E_3$ for the instruction Z are carried out sequentially without intermission. The execution of the three instruction is completed at a time point $t_8$.

Next, when the instruction X designates the execution and the loading of the execution result into the register 19, the instruction Y designates the storing of the output of the register 19 into the memory 17 and the MMU, and the instruction Z does not designate the loading of data of the memory 17 into the register 19 through the register 18 and the selector 25, the F/Fs 1101 and 1102 of the register 11' become "1 and 0", respectively. As a result, the EX-cycle $E_1$ for the instruction X and the EX-cycle $E_{12}$ for the alternative operation to the instruction Y are performed in parallel. The EX-cycle $E_3$ for the instruction Z is started at the time point $t_5$ after such parallel execution of the cycles $E_1$ and $E_{12}$ has been completed.

When the instruction X designates the execution and the loading of the execution result into the register 19, the instruction Y designates the storing of the output of the register 19 into the MMU, and the instruction Z designates the loading of data of the memory 17 into the register 19 through the register 18 and the circuit 25, the F/Fs 1101 and 1102 of the register 11' become "1 and 1", respectively. However, as soon as the circuit 22 detects the coincidence between a write address of the memory 17 designated by the address portion of the instruction Y and a read address of the memory 17 designated by the address portion of the instruction Z, the output of the F/F 128 in the circuit 12 during the execution of the instruction Y will be "0". As a result, the EX-cycle $E_1$ for the instruction X and the EX-cycle $E_{12}$ for the alternative operation to the instruction Y are performed in parallel, and the EX-cycle $E_3$ for the instruction Z is started in series at the time point $t_5$ after the parallel operation in the cycles $E_1$ and $E_{12}$ has been completed.

Figure 6:
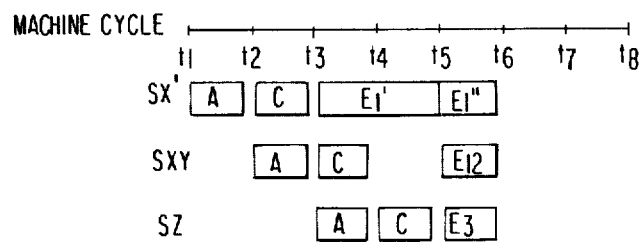

Referring to FIG. 6, in response to "1 and 1" of the F/Fs 1101 and 1102 of the register 11' and the detection of the non-coincidence between the write address and the read address by the circuit 22, the EX-cycle $E_1''$ for the loading of the execution result into the register 19 is inhibited by the circuit 12. The cycle $E_1''$ in the EX-cycle for the instruction X is started at the time point $t_5$.

In such a inhibiting operation, the EX-cycle $E_{12}$ for the alternative operation and the EX-cycle $E_3$ are performed in parallel at the time point $t_5$. The operation result obtained during the execution of the instruction X is stored into the write address of the memory 17 designated by the address portion of the instruction Y in the EX-cycle $E_{12}$. In the cycle $E_3$ for the execution of the instruction Z, data is read out from the memory 17 into the register 19.

Next, the operation of these EX-cycles will be described in more detail with reference to FIG. 4.

In response to a "1" of from the AND gate 126 in the circuit 12, the selector 24 sends the execution result from the circuit 23 to a path 241. The execution result is stored in an address of the memory 17 designated by the address portion of the instruction Y. This operation is done in the EX-cycle $E_{12}$ for the alternative operation. In parallel with these operations, the selector 25 sends out the output of the register 18 to a path 251 in response to a "1" output of the gate 127. The data so sent is stored in the register 19. This operation is done in the EX-cycle $E_3$ for the instruction Z. The EX-cycle $E_{12}$ forms a part of the EX-cycle $E_1''$ for the instruction X. In the EX-cycle $E_{12}$, the execution result from the circuit 23 is stored in the register 19 through the selector 25 and the path 251. In the EX-cycle $E_2$ for the instruction Y, the execution result from the register 19 is stored in the memory 17 through the selector 24 and the path 241. Consequently, the same result as that of the execution of the instructions X, Y, and Z is obtained at the time point $t_6$. This means that the whole instruction processing time with the second embodiment becomes shorter by 2 machine cycles than that of such a conventional system.

Besides the above-embodiments, many modifications and alternatives thereto may be devised by those skilled in the art without departing from the scope of the invention defined by the appended claims.

What is claimed is:

1. A pipeline controlled data processing system for executing instructions, wherein each instruction is executed in a plurality of sequential stages with the sequential stages of first and second consecutive instructions overlapping in time with one another and wherein the last stage of execution of each instruction is an execution cycle, each of said instructions having an address portion, said system including a register means to be loaded with an execution result in response to an instruction, and memory means having a plurality of locations, said data processing system further comprising:

instruction prefetch means connected to said memory means for prefetching instructions from said memory means and decoding said instructions;

first detection means connected to said instruction prefetch means for detecting that the execution cycle of a first instruction requires more than one machine cycle to be performed and for detecting that said first instruction instructs the generation of a first execution result and the loading of said first execution result into said register means;

second detection means connected to said instruction prefetch means for detecting that a second instruction, following said first instruction and prefetched by said instruction prefetch means prior to completion of the execution of said first instruction, requires fewer machine cycles to be performed than said first instruction and instructs the storing of said first execution result from said register means into a location of said memory means designated by said address of said second instruction;

control means responsive to said first and second detection means for supplying a control signal before the completion of said first instruction; and execution means responsive to said control signal for storing said first execution result into the location of said memory means designated by said address of said second instruction and simultaneously with the loading of said first execution result into said register means in accordance with said first instruction, to thereby complete the execution of said first and second instructions at the same time.

2. A pipeline controlled data processing system for executing instructions, wherein each instruction is executed in a plurality of sequential stages with the sequential stages of first and second consecutive instructions overlapping in time with one another and wherein the last stage is an execution cycle, each of said instructions having an address portion, said systems including register means to be loaded with an execution result in response to an instruction, and memory means having a plurality of locations, said data processing system further comprising:

instruction prefetch means connected to said memory means for prefetching instructions from said memory means and for decoding said instructions;

first detection means connected to said instruction prefetch means for detecting that the execution cycle of a first instruction requires more than two machine cycles to be performed and that said first instruction instructs the generation of a first execution result and the loading of a first execution result into said register means;

second detection means connected to said instruction prefetch means for detecting that a second instruction, following said first instruction and prefetched by said instruction prefetch means prior to completion of the execution of said first instruction, requires fewer machine cycles to be performed than said first instruction and instructs the storing of said first execution result from said register means into a location of said memory means designated by said address of said second instruction;

third detection means connected to said instruction prefetch means for detecting that a third instruction, following said second instruction and prefetched by said instruction prefetch means prior to completion of the execution of said first instruction, requires fewer machine cycles to be performed than said first instruction and instructs the loading of the contents of a location of said memory means designated by said address of said third instruction into said register means;

control means responsive to said first, second and third detection means for supplying a control signal before the completion of said first instruction; and execution means responsive to said control signal for storing said first execution result into the location of said memory means designated by said address of said second instruction and simultaneously loading the contents of said location of said memory means designated by said address of said third instruction into said register means, to thereby complete the execution of said first, second and third instructions at the same time.

* * * * *